INVENTOR.
BY RONALD FORTUNE
ATTORNEY.

United States Patent Office 2,907,346
Patented Oct. 6, 1959

2,907,346

DIAPHRAGM VALVE

Ronald Fortune, Hamilton, Ontario, Canada, assignor of one-tenth to Edward H. Lang, Hinsdale, Ill.

Application February 17, 1956, Serial No. 566,303

10 Claims. (Cl. 137—601)

This invention relates to diaphragm valves employing a flexible diaphragm between the outer margins of the body chamber and the bonnet to isolate the bonnet and the stem mechanism from the fluid conveyed through the valve, thus eliminating the need for a stuffing box around the stem. More particularly it pertains to a novel valve construction wherein two separate impermeable flexible diaphragms are employed in combination with a novel form of body providing two individual flow-control orifices, whereby to equally divide the flow of fluid through the valve so that each diaphragm, over its effective flexural area, carries half the total pressure load thereon.

In prior valves, one form of valve construction employs a single diaphragm to control and shut off the flow by contact with a transverse seating surface in the valve body. Another prior valve employs a single diaphragm to close against a circular orifice. In these prior valves the inherent construction necessitates proportioning a single flexible diaphragm to accommodate an abnormally large opening in one section of the chamber of the valve body on which the diaphragm is mounted. These prior designs and constructions present a problem, because the inherently expansive area of diaphragm exposed to pressure of fluid from within the valve chamber, imposes a greatly amplified load on the single diaphragm, thus accelerating wear and rupture of the diaphragm. These disadvantages in the prior art are more apparent in large capacity valves wherein a single diaphragm moves throughout a much greater flexural distance between fully open and fully closed position and vice versa.

In those prior valves, it has been found that when the flow of fluid is decreased appreciably below the efficient rated volumetric capacity of the valve, with the diaphragm maintained in the fully open position, the velocity of the fluid also decreases so that the fluid flow becomes incapable of carrying the denser suspended substances through the chamber of the valve. For example, high density substances in ore slurries and in wood pulp solutions tend to settle within the valve and gradually accumulate into an obstructive mass, thus restricting the flow.

It is therefore one object of my invention to provide a diaphragm valve with means for equally dividing the rated volumetric capacity between two individual flow-control orifices and means for simultaneously or separately controlling each orifice.

Another object of this invention is to provide a diaphragm valve employing two independent obturating diaphragms whereby to divide the effective free-flexing area and the pressure load acting thereon, equally between each diaphragm.

A further object of this invention is to provide a valve incorporating a novel form of body characterized by a chamber having two parallelly disposed flanged openings, spaced apart axially, for mounting two opposed flexible diaphragms, thus providing two extensive deformable areas in the boundaries of the chamber, to prevent sedimentation within the valve, regardless of the position in which the valve is mounted.

A still further object of the invention is to provide a body of generally symmetrical proportions about the longitudinal and cross sectional axes and having open spaces through the chamber to simplify moulding and machining production.

A still further object of the invention is to provide a body incorporating a simple integral housing for securely and symmetrically mounting closure mechanisms and to ensure their being remote from the fluid passing through the valve.

Other objects and advantages will become apparent from a study of the following detailed specification taken in conjunction with the accompanying drawings.

In the drawings.

Similar reference numerals or letters refer to similar parts throughout the drawings.

Figure 1:
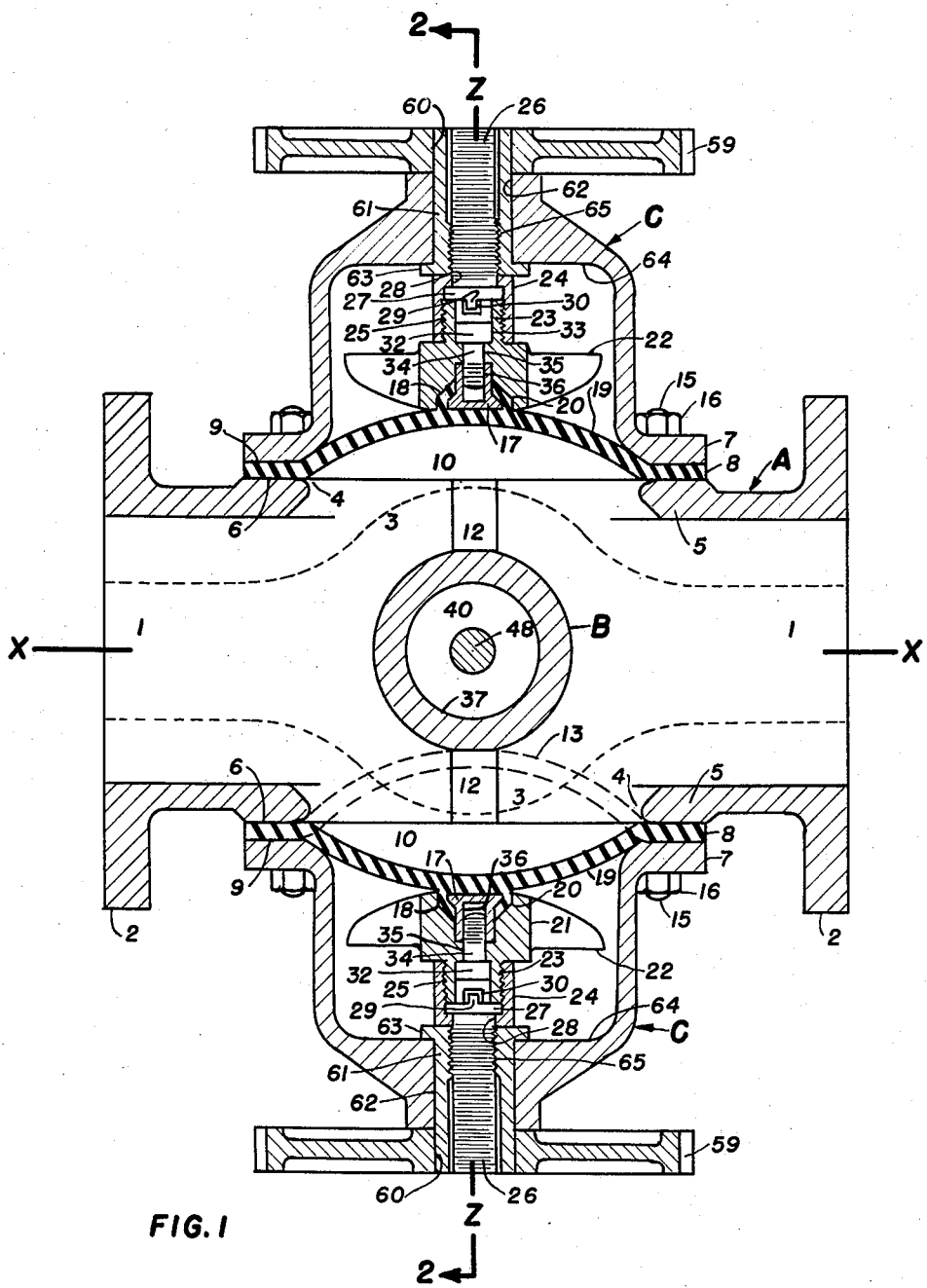
Figure 1 is a sectional view of an assembled structure of my invention taken along the central longitudinal axis (line 1—1 of Figure 2) showing the valve in the fully opened position with both diaphragms in their outermost arcuate configuration.

Referring to the drawings and particularly to Figure 1, the letter A indicates the novel valve body having inlet and outlet passages 1 of substantially equal cross sectional areas. As the valve may be used to control the flow of fluid in either direction, each passage is indicated by the same numeral 1. Conventional end connecting flanges 2 are shown; however, any suitable type of connecting ends may be employed depending on the service for which the valve is intended and whether the pipe line, in which the valve is connected, is screwed or flanged.

Figure 2:
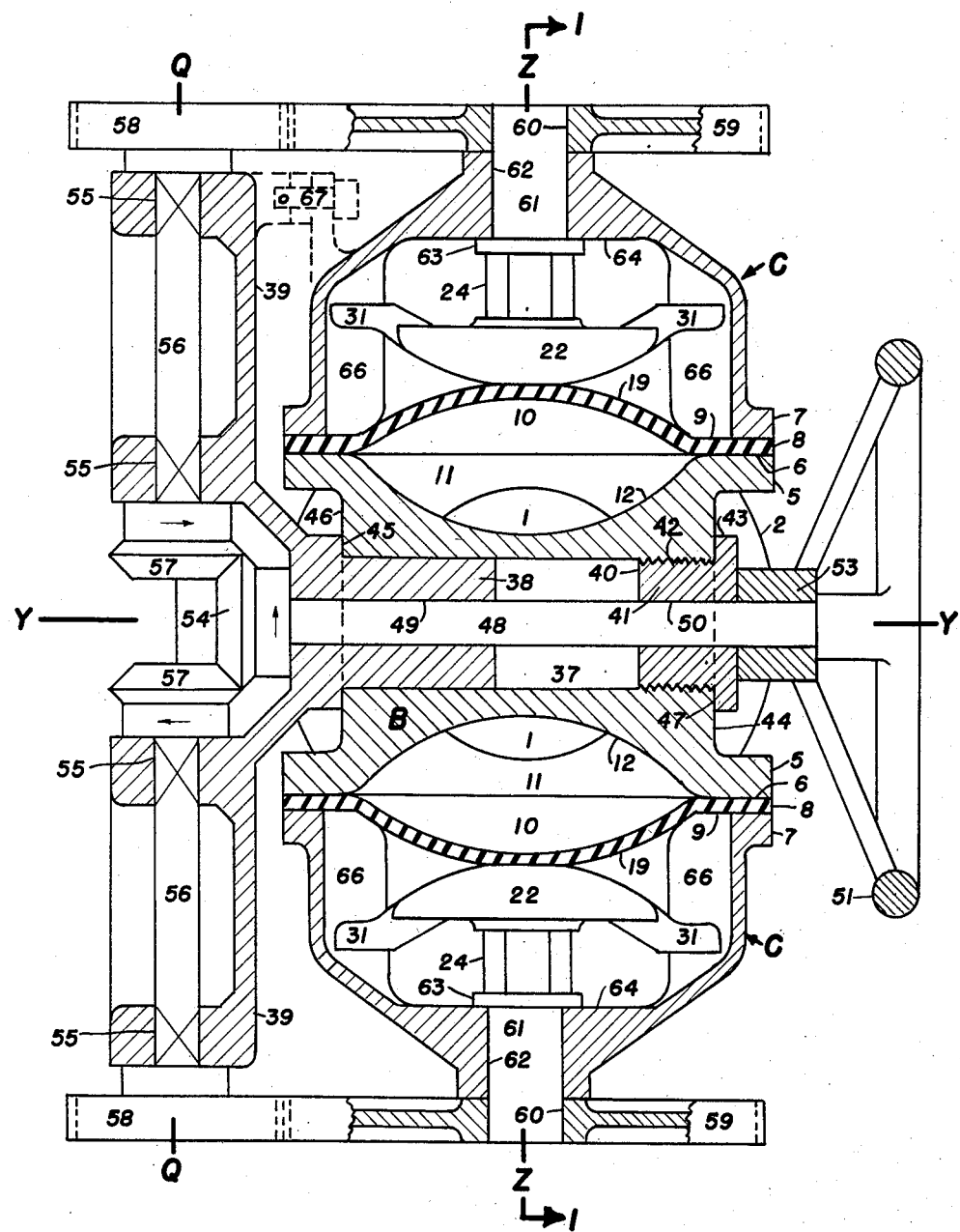
Figure 2 is a cross section of the assembled structure taken on the line 2—2 of Figure 1 showing the transversely disposed double-seated bridge bisecting the flow chamber and the two transversely disposed flow-control orifices. This view also illustrates one mode of mounting and supporting geared auxiliary closing mechanism compactly within the cylinder of the symmetrically transverse bridge.

The body A has an intermediate chamber 3 having two circular openings 4 of substantially identical diameter bounded by marginal mounting flanges 5. Preferably formed integrally or cast as part of the body A is the bridge B which bisects the chamber 3 centrally and is positioned transversely along the axis Y—Y as shown in Figure 2. The chamber flanges 5 have two parallely opposed surfaces 6 which match the flanges 7 of the bonnets C. Two axially opposed dish-shaped diaphragms 8 are mounted on the surfaces 6 of the flanges 5 and are clamped at their outer margins between the surfaces 6 and surfaces 9 of the bonnets to close the openings 4. In the assembled position, the two dish-shaped diaphragms 8 form two extensive part-spherical segments 10 of the chamber 3 thus combining with the rigid boundary of the chamber to provide an open annular space surrounding the bridge B.

To more fully appreciate the merits of this invention, it is important to observe (Fig. 2) that the design and construction is devised to divide the flow of fluid between two control orifices 11 and that these communicating orifices are capable of being controlled simultaneously or individually. The diaphragms 8, in their fully open convex or dish-shaped position as shown, form the outermost deformable segments of the chamber 3. When the diaphragms are moved inwardly towards contact with the inwardly diverging arcuate seats 12 as indicated by the dotted lines 13 in Figure 1, any sediment that has collected is disintegrated and ejected from the chamber 3, regardless of the position in which the valve is mounted.

The employment of two equally proportioned orifices 11 makes it possible to decrease by 50% the area of each diaphragm exposed to pressure of fluid from within the valve and to decrease by approximately 29% the total flexural displacement of each diaphragm 8 between the fully open and fully closed positions, thus minimizing the working stress on each diaphragm, increasing their durability and improving the reliability of the valve. Moreover, the construction provides smooth symmetrical flow contours throughout, resulting in minimum turbulence and pressure drop.

In Figure 2 there is shown one mode of closure mechanism particularly adapted for handwheel operation in conjunction with a transmission of gears. Two individual bonnets C are mounted along the axis Z—Z and are located in clamped registration with the body flanges 5 and bonnet flanges 7, preferably by means of studs 15 and nuts 16, Figure 1.

Preferably each diaphragm 8 incorporates an integrally moulded rigid insert 17 which is moulded into the projection 18 at the central region of the outer diaphragm surface 19. The composite projection fits into a corresponding female cavity 20 in the hub 21 of the compressor or follower member 22. The hub 21 is provided with an extension 23 for connecting the retaining cap 24 threadedly as at 25. The threaded stem 26 has an integrally formed head 27 which fits within the retaining cap 24. The body of the threaded stem passes freely through the smaller diameter opening 28 of the cap and the head 27 has an integrally formed projecting male key 29 which is loosely receivable in the mating female slot 30 to prevent rotation of the screw. This construction is shown and described in Patent Number 2,702,686. By the mode of connection, a flexible coupling is provided for each closure assembly to impart toggle motion to the compressor 22 to compensate for any misalignment of the transversely extended horns 31 (Fig. 2) and to ensure accurate configuration when compressing the diaphragm 8 into fluid tight contact with the arcuate seat 12.

Preferably each diaphragm is fastened at the central axis, on the center surface of the diaphragm remote from the fluid, employing the cap screw 32 the head of which is retained in the recess 33 of the extension 23. The body 34 of the screw passes through the hole 35 to threadedly engage a tapped hole 36 in the rigid insert 17.

It should be obvious that means, other than that shown in Fig. 1, for attaching the diaphragms 8 centrally at their outer surfaces 19 to the hubs 21 of the compressors may be employed in services above atmospheric pressure. Under such positive pressures, the valve may be practically employed without means for attaching the diaphragms.

So far the description of the invention has been devoted to the valve proper, comprising the unique employment of two axially opposed diaphragms in combination with a novel body, and providing two separately opposed transversely disposed orifices for controlling the flow of fluid through the valve. However, it provides other important advantages. Referring to Figure 2, there is shown one mode for compactly and securely mounting auxiliary closing mechanism which is simple in design, yet provides adequate structural support and maintains accurate alignment of the working components. The transverse bridge B has a cylindrical housing or bore 37 into one end of which is slidably receivable the trunnion 38 of the frame 39. The opposite end of the bore 37 receives the hub 40 of bearing 41 which may be threadedly fastened as at 42 into the bore 37, or alternately the flange 43 may be fastened to the outer face 44 by any conventional fastening means. The main shaft 48 is maintained in relative end location at one end by the shoulder 45 of the trunnion 38 which abuts against the outer face 46; and at the other end by the flange 43 the inner face 47 of which abuts against the outer face 44. The transverse main shaft 48 is maintained in accurate axial alignment within the bore 49 of the trunnion 38 and the bore 50 of the bearing 41. To one end of the main shaft 48, the handwheel 51 is rigidly fastened by mounting the hollow hub 53, on the shaft by any suitable conventional means. To the other end of the main shaft 48, the mitre gear 54 is also rigidly connected. At right angles to the axis Y—Y of the main shaft 48, the frame 39 is formed with parallely aligned bores 55 for mounting two separately opposed countershafts 56 and to maintain them in accurate axial alignment one with the other and in fixed right-angular relation with the main shaft 48. Moreover, the construction is devised to keep the axis Q—Q of the countershafts 56 in accurate parallel relation with the axis Z—Z of the valve.

The main mitre gear 54 on the axis Y—Y intermeshes with two opposed mitre gears 57 on the axis Q—Q. The gears 57 are keyed or otherwise fastened to the inner ends of the countershafts 56. To the outer ends of the countershafts, the spur pinions 58 are similarly fastened. To complete the train of gears, the spur pinions 58 mesh with the spur gears 59, the latter being rigidly mounted by means of bores 60 on the outer ends of rotatable yoke sleeves 61 by any suitable method. The yoke sleeves 61 rotate freely in the bores 62 of the bonnets C and the thrust flanges 63 abut against the faces 64 in the bonnets.

In operation, rotation of handwheel 51 turns the main shaft 48 and mitre gear 54, which imparts rotary motion to the mitre gears 57. The countershafts 56 thus rotate in reverse directions causing the spur pinions 58 also to rotate in opposite directions, meshing with the spur gears 59 to impart rotational motion to the yoke sleeves 61. The externally threaded stems 26 mate with the internally threaded yoke sleeves as at 65 causing the bonnet-enclosed mechanisms and the diaphragms to move inwardly towards the arcuate seats 12 or outwardly therefrom by rotation of the handwheel 51 in clockwise or anti-clockwise direction. The horns 31 of the follower members 22 extend into the cored grooves 66 of the bonnets (Figure 2) to prevent rotation of the bonnet-enclosed mechanisms during movement towards or away from the arcuate seats 12.

This particular design and construction of auxiliary closing mechanism is devised to permit positive and relatively accurate graduation for simultaneously controlling both transverse orifices. Moreover, the opposite rotation of the individual countershafts 56, permit identical hand external and internal threads for the stems 26 and yoke sleeves 61. The frame 39 together with the countershaft assembly on the axis Q—Q is rotatable about the axis Y—Y as the trunnion 38 is free to rotate in the bore 37 of the bridge B. When in use, the frame 39 is anchored in the position shown in Figure 2 by the simple lugs and pin connection 67 (Figure 2) or by any known conventional means.

Either orifice may be closed and remain inoperative by removal of either one of the spur pinions 58. Either spur gear 59 may be used as a handwheel to close off the orifice selected.

It should be obvious that the valve may be stripped of the complete auxiliary closing mechanism and that individual handwheels may be substituted for the spur gears 59 so that the control orifices 11 may be separately and independently operated. The design and construction also makes it possible for one man to close large diaphragm valves by applying normal effort at the handwheel regardless of whether the valve is equipped with or without the auxiliary geared mechanism. While the auxiliary closing mechanism permits simultaneous and rapid closure of both orifices, the substitution of two separate handwheels permits independent manipulation of each orifice and makes possible manual closure not heretofore possible in large capacity diaphragm valves as the effective pressure load on each diaphragm is now decreased by half.

I claim and particularly point out as my invention:

1. A diaphragm valve comprising a body portion having an inlet and an outlet passage of substantially equal cross sectional area and a flow control chamber positioned therebetween, said chamber having two openings spaced apart in equidistant relation from the center of said chamber and on opposite sides of the common axis of said chamber and passageways, each opening being concentric one with the other and defined by respectively opposite flanges lying in a plane parallel to said axis, two co-axially aligned individual bonnets with matching flanges mounted on the opposite flanges of said chamber, a fluid-impermeable dish-shaped diaphragm clamped at its peripheral area between the flange of each chamber opening and matching bonnet flange whereby to seal said bonnets from said body portion, a bridge formation formed as an integral part of said body portion, suspended centrally within said chamber and bisecting the chamber transversely of said axis, said bridge having two opposite inwardly converging arcuate seats extending the entire width of said chamber in alignment with the centers of said diaphragms, said diaphragms, when flexed to their outermost dish-shaped configuration away from said seats, forming in conjunction therewith two opposed transversely disposed flow-control orifices having a combined cross sectional area when the valve is fully opened, substantially equal to the cross sectional area of said passages, and means for compressing said diaphragms into fluid tight contact with said seats.

2. A diaphragm valve as claimed in claim 1 including means for controlling the movement of said diaphragms simultaneously.

3. A valve in accordance with claim 2 in which said means comprises a hollow passageway in the center of said bridge, a shaft rotatably mounted in said passageway, means at one end of said shaft for rotating it, a gear mounted adjacent the other end of said shaft, a gear train actuated by the gear mounted on said shaft, a stem mounted in each of said bonnets and operatively connected to said diaphragms, said gear train being operatively connected to said stems.

4. A valve in accordance with claim 1 including means for controlling the movement of said diaphragms independently of each other.

5. A diaphragm valve comprising a body portion having an inlet passage and an outlet passage in axial alignment and of substantially the same cross-sectional area, a flow chamber positioned between and connected to said passages, said chamber having two separate openings opposite each other and on opposite sides of the common axis of said chamber and passages, each of said separate openings being defined by a flange, a bonnet with a matching flange mounted on each of said opening flanges, a fluid-impermeable diaphragm clamped at its peripheral area between each pair of adjacent opening and bonnet flanges whereby to seal said bonnets from said body portion, a bridge, formed as an integral part of said body portion, suspended centrally within and extending across said chamber from wall to wall between said diaphragms in a direction at right angles to the axis of said passages and forming a fluid barrier between said passages, said bridges having two opposite inwardly converging seats upon which said diaphragms are adapted to rest when in closed position extending across the entire width of said chamber in the same direction as said bridge, said diaphragms when flexed to their outermost position away from said seats forming in conjunction therewith two separate opposite flow-control orifices connecting said passages and having a combined cross-sectional area substantially equal to that of each of said passages, and means for compressing said diaphragms into fluid tight contact with said seats.

6. A diaphragm valve in accordance with claim 5 including means for simultaneously compressing said diaphragms.

7. A diaphragm valve in accordance with claim 5 including means for independently compressing said diaphragms.

8. A diaphragm valve in accordance with claim 6 in which said compressing means are fastened to the centers of said diaphragms.

9. A diaphragm valve in accordance with claim 7 in which said compressing means are fastened to the centers of said diaphragms.

10. A diaphragm valve comprising a body portion having an inlet passage and an outlet passage, a flow chamber positioned between and connected to said passages, a bridge suspended centrally within said chamber and forming a fluid barrier between said passages, said bridge having two opposite seats, a bonnet mounted on said body opposite each of said seats, a flexible diaphragm mounted opposite each seat between said body and each of said bonnets so as to form two separate fluid-control orifices through said chamber when flexed away from said seats, means for simultaneously and conversely compressing each of said diaphragms into fluid tight relationship with the seat opposite it, said means comprising a rotatable shaft journalled in said bridge, means for rotating said shaft, a gear mounted adjacent one end of said shaft, a gear train actuated by the gear on said shaft; a reciprocating stem mounted in each bonnet, a compressor fastened to the end of each stem and in contact with the diaphragm mounted between the body and the respective bonnet, said gear train being operatively connected to said stems, to reciprocate said stems and compressors toward and away from said diaphragms.

References Cited in the file of this patent

UNITED STATES PATENTS

| 1,690,251 | Schlesinger et al. | Nov. 6, 1928 |
| 2,159,540 | MacClatchie | May 23, 1939 |
| 2,186,024 | Iler | Jan. 9, 1940 |
| 2,194,257 | Allen | Mar. 19, 1940 |
| 2,247,363 | Dunn | July 1, 1941 |
| 2,579,982 | Trump | Dec. 25, 1951 |
| 2,750,808 | Mills | June 19, 1956 |

FOREIGN PATENTS

| 489,794 | Italy | Jan. 26, 1954 |